(12) United States Patent
Switzer, III et al.

(10) Patent No.: US 11,137,527 B2
(45) Date of Patent: Oct. 5, 2021

(54) MIXED SPACER MULTISPECTRAL FILTER

(71) Applicant: Viavi Solutions Inc., Milpitas, CA (US)

(72) Inventors: James Switzer, III, Santa Rosa, CA (US); Georg J. Ockenfuss, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 442 days.

(21) Appl. No.: 15/601,740

(22) Filed: May 22, 2017

(65) Prior Publication Data

US 2018/0335556 A1 Nov. 22, 2018

(51) Int. Cl.
*G02B 5/20* (2006.01)
*G02B 5/28* (2006.01)

(52) U.S. Cl.
CPC ............. *G02B 5/201* (2013.01); *G02B 5/281* (2013.01); *G02B 5/288* (2013.01)

(58) Field of Classification Search
CPC .. G02B 5/0816; G02B 5/0825; G02B 5/0833; G02B 5/28; G02B 5/281; G02B 5/285; G02B 5/288; G02B 5/289
USPC ....... 359/350, 359, 360, 577, 580, 582, 585, 359/586, 588, 589, 590, 885; 250/226
See application file for complete search history.

(56) References Cited

U.S. PATENT DOCUMENTS

| | | | | |
|---|---|---|---|---|
| 5,398,133 A | * | 3/1995 | Tsai | G02B 5/281 359/359 |
| 7,901,870 B1 | * | 3/2011 | Wach | G02B 5/28 430/321 |
| 9,823,395 B2 | * | 11/2017 | Weber | G02B 5/285 |
| 2004/0080830 A1 | | 4/2004 | Leu et al. | |
| 2005/0231800 A1 | * | 10/2005 | Lippey | G02B 5/0875 359/443 |
| 2008/0042782 A1 | | 2/2008 | Wang et al. | |
| 2008/0280147 A1 | * | 11/2008 | Thiel | B32B 17/10174 428/428 |
| 2014/0014838 A1 | * | 1/2014 | Hendrix | G02B 5/281 250/338.1 |

(Continued)

FOREIGN PATENT DOCUMENTS

EP 3 187 909 A1 7/2017
JP S62 267624 A 11/1987

OTHER PUBLICATIONS

Extended European Search Report corresponding to EP 1817058.7 dated on Oct. 9, 2018, 10 pages.

*Primary Examiner* — Nicholas R. Pasko
(74) *Attorney, Agent, or Firm* — Harrity & Harrity, LLP

(57) ABSTRACT

An optical filter may include a first mirror, a second mirror, and a spacer layer structure disposed between the first mirror and the second mirror. The spacer layer structure may include a first set of layers. Each layer, of the first set of layers, may be a first material associated with a first refractive index and a thickness that is greater than a layer thickness threshold. The spacer layer structure may include a second set of layers. Each layer, of the second set of layers, may be a second material associated with a second refractive index. Each layer, of the second set of, may be selected to replace a corresponding layer of the first material. The corresponding layer may be associated with a thickness that is less than the layer thickness threshold.

20 Claims, 19 Drawing Sheets

| coating run | spacer thickness [nm] | |
|---|---|---|
| | Si:H only | Si:H + NbTiOx |
| 1 | mirror | |
| 1 | 92.633 | |
| 2 | 38.468 | |
| 3 | 19.234 | |
| 4 | 9.617 | |
| 5 | 4.809 | 11.800 |
| 6 | 2.404 | 5.900 |
| 7 | 1.202 | 2.950 |
| 8 | mirror | |

(56) References Cited

U.S. PATENT DOCUMENTS

| | | | |
|---|---|---|---|
| 2014/0272217 A1* | 9/2014 | Weber .................... | H05K 13/00 |
| | | | 428/34.6 |
| 2016/0216419 A1* | 7/2016 | Sprague .............. | C23C 14/3414 |
| 2016/0223729 A1* | 8/2016 | Medwick ............ | C03C 17/3681 |
| 2016/0238759 A1 | 8/2016 | Sprague et al. | |
| 2017/0059753 A1* | 3/2017 | Wagner ................ | C03C 17/366 |
| 2017/0108631 A1 | 4/2017 | Murakawa et al. | |

* cited by examiner

| Layer # | Material Name | n | # of QW | Phys Thick (nm) | Q.W.O.T. Matched |
|---|---|---|---|---|---|
| substrate | | | | | |
| 1 | Si_H | 3.7226 | 1 | 62.6 | 932 |
| 2 | SiO2 | 1.4664 | 1 | 158.9 | 932 |
| 3 | Si_H | 3.7226 | 1 | 62.6 | 932 |
| 4 | SiO2 | 1.4664 | 1 | 158.9 | 932 |
| 5 | Si_H | 3.7226 | 2 | 125.2 | 1864 |
| 6 | SiO2 | 1.4664 | 1 | 158.9 | 932 |
| 7 | Si_H | 3.7226 | 1 | 62.6 | 932 |
| 8 | SiO2 | 1.4664 | 1 | 158.9 | 932 |
| 9 | Si_H | 3.7226 | 1 | 62.6 | 932 |
| air | | | | | |

FIG. 2A

| coating run | spacer thickness [nm] | |
|---|---|---|
| | Si:H only | Si:H + NbTiOx |
| 1 | | mirror |
| 1 | 92.633 | |
| 2 | 38.468 | |
| 3 | 19.234 | |
| 4 | 9.617 | |
| 5 | 4.809 | 11.800 |
| 6 | 2.404 | 5.900 |
| 7 | 1.202 | 2.950 |
| 8 | mirror | |

| wavelength [nm] | material | | | |
|---|---|---|---|---|
| | SiH | NbTiOx | SiO2 |
| 800 | 3.852 | 2.342 | 1.469 |
| 930 | 3.7225 | 2.323 | 1.466 |
| 1100 | 3.639 | 2.308 | 1.464 |

| wavelength [nm] | material | | | |
|---|---|---|---|---|
| | SiH | NbTiOx | SiO2 |
| 800 | 0.0% | 0.0% | 0.0% |
| 930 | -3.4% | -0.8% | -0.2% |
| 1100 | -5.5% | -1.5% | -0.3% |

FIG. 5B

| coating run | spacer thickness [nm] | |
|---|---|---|
| | Si:H only | Si:H + SiO2 |
| 1 | mirror | |
| 1 | 92.633 | |
| 2 | 38.468 | |
| 3 | 19.234 | |
| 4 | 9.617 | |
| 5 | 4.809 | 30.4 |
| 6 | 2.404 | 15.2 |
| 7 | 1.202 | 7.6 |
| 8 | mirror | |

FIG. 6A

MIXED SPACER MULTISPECTRAL FILTER

BACKGROUND

A multispectral sensor device may be utilized to capture information. For example, the multispectral sensor device may capture information relating to a set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies. A particular sensor element, of the sensor element array, may be associated with a filter that restricts a range of frequencies that are directed toward the particular sensor element.

SUMMARY

According to some possible implementations, an optical filter may include a first mirror, a second mirror, and a spacer layer structure disposed between the first mirror and the second mirror. The spacer layer structure may include a first set of layers. Each layer, of the first set of layers, may be a first material associated with a first refractive index and a thickness that is greater than a layer thickness threshold. The spacer layer structure may include a second set of layers. Each layer, of the second set of layers, may be a second material associated with a second refractive index. Each layer, of the second set of, may be selected to replace a corresponding layer of the first material. The corresponding layer may be associated with a thickness that is less than the layer thickness threshold.

According to some possible implementations, a multispectral filter may include a first mirror deposited on a substrate associated with a set of sensor elements and to partially reflect light from a light source. The multispectral filter may include a second mirror to partially reflect light from the light source. The multispectral filter may include a spacer disposed between the first mirror and the second mirror and including a plurality of layers associated with a plurality of channels corresponding to the set of sensor elements. A first one or more layers, of the plurality of layers, may be hydrogenated silicon with a first refractive index. Each of the first one or more layers may be associated with a thickness greater than a layer thickness threshold. A second one or more layers, of the plurality of layers, may be associated with a material with a second refractive index.

According to some possible implementations, an optical filter may include a substrate. The optical filter may include a set of optical filter layers disposed onto the substrate. The set of optical filter layers may include a first subset of optical filter layers associated with a first refractive index. The set of optical filter layers may include a second subset of optical filter layers associated with a second refractive index that is less than the first refractive index. The set of optical filter layers may form a plurality of channels. Each channel may be associated with passing light at a corresponding center wavelength. Each center wavelength may be separated from an adjacent center wavelength by less than a threshold channel separation.

BRIEF DESCRIPTION OF THE DRAWINGS

FIGS. 2A-2D are diagrams of characteristics relating to a multispectral filter described herein;

FIGS. 4A-4E are diagrams of characteristics relating to a multispectral filter described herein;

FIGS. 5A and 5B are diagrams of characteristics relating to a multispectral filter described herein; and FIGS. 6A-6D are diagrams of characteristics relating to a multispectral filter described herein.

DETAILED DESCRIPTION

Figure 1:
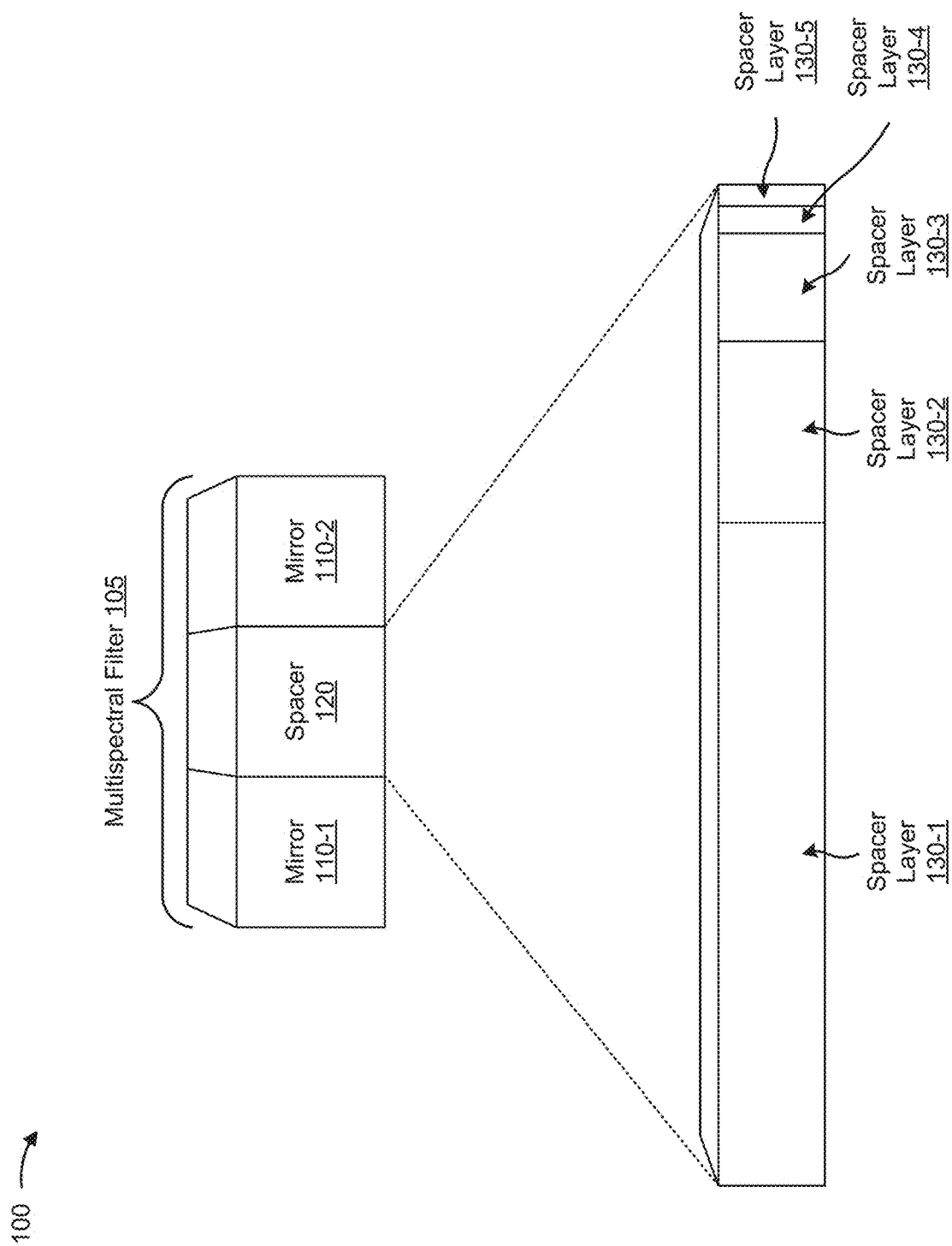
FIG. 1 is a diagram of an overview of an example implementation described herein.

The following detailed description of example implementations refers to the accompanying drawings. The same reference numbers in different drawings may identify the same or similar elements.

A sensor element (e.g., an optical sensor) may be incorporated into an optical sensor device to obtain information (e.g., spectral data) regarding a set of electromagnetic frequencies. For example, the optical sensor device may include an image sensor, a multispectral sensor, or the like that may perform a sensor measurement of light. The optical sensor device may utilize one or more sensor technologies, such as a complementary metal-oxide-semiconductor (CMOS) technology, a charge-coupled device (CCD) technology, or the like. The optical sensor device may include multiple sensor elements (e.g., an array of sensor elements) each configured to obtain information.

A sensor element may be associated with a filter that filters light to the sensor element. For example, the sensor element may be aligned with a linear variable filter (LVF), a circular variable filter (CVF), a Fabry-Perot filter, or the like to cause a portion of light directed toward the sensor element to be filtered. For a binary filter structure, such as a Fabry-Perot filter, hydrogenated silicon (Si:H) may be selected for layers of a spacer that is positioned between mirrors of the binary filter structure. Hydrogenated silicon is associated with a relatively high refractive index in the near-infrared spectral range (e.g., a refractive index of greater than approximately 3.5), which results in a relatively low angle-shift. However, the relatively high refractive index results in a relatively small physical thickness for some layers of the spacer layers. For example, for a 64 channel sensor element array associated with a wavelength range of between approximately 800 nanometers (nm) and 1100 nm, at least one layer of a spacer may be less than approximately 1.2 nm in thickness. Similarly, for a similar 128 channel sensor element array, at least one layer of a spacer may be less than approximately 0.6 nm in thickness. A layer thickness of less than a threshold layer thickness (e.g., less than approximately 5 nm, less than approximately 2 nm, less than approximately 1.5 nm, less than approximately 1 nm, less than approximately 0.75 nm, etc.) may result in difficult manufacturability for a filter.

A filter may be exposed to environmental conditions that result in degradation of the filter. For example, during a patterning procedure or a cleaning procedure, layers of a spacer of the filter, which are exposed to the patterning procedure or the cleaning procedure, may undergo a chemical composition change. Moreover, ambient conditions during operation, such as exposure to room temperature conditions may result in degradation of a filter. In this case, for a filter using hydrogenated silicon for layers of the spacer, a portion of a hydrogenated silicon layer may convert to an oxide layer (e.g., silicon oxide (SiO), silicon dioxide (SiO2), etc.) to form a mixed hydrogenated silicon and oxide layer. In other words, a layer of hydrogenated silicon may be changed to a first portion of hydrogenated silicon and a second portion of oxide. The portion of the hydrogenated silicon layer that converts to the oxide layer as a result of environmental conditions may be associated with a thickness of greater than approximately 0.5 nm, greater than approximately 1 nm, greater than approximately 1.5 nm, greater than approximately 2 nm, greater than approximately 5 nm, or the like. Based on a change in chemical composition of a layer from a hydrogenated silicon material (or another oxidizable material) to an oxide material and based on a layer thickness of the layer being unchanged or being changed by less than a threshold amount, a refractive index of the layer may change from approximately 3.7 at approximately 930 nm to approximately 1.47 at approximately 930 nm. Based on the changed refractive index, a desired optical thickness of the layer may change by a ratio of the refractive indexes. For example, the desired optical thickness may be reduced to 1.47/3.7=40% of a thickness with which the layer was initially formed using hydrogenated silicon. As a result, the optical thickness of the layer and the desired optical thickness of the layer may be mismatched, which may result a shift in a center wavelength of the filter.

Some implementations, described herein, provide a multispectral filter array with a controlled composition for a mixed spacer, such as deposited layers of hydrogenated silicon and deposited layers of oxide or the like. In this way, a durable (i.e., environmentally stable) multispectral filter array may be provided for a sensor element array. Moreover, the multispectral filter array may be associated with a reduced center wavelength shift relative to a filter with an uncontrolled composition (e.g., a filter with a hydrogenated silicon layer of less than a layer thickness threshold that oxidizes into a mixed hydrogenated silicon and oxide layer). Furthermore, a minimum thickness of a layer of a spacer for the multispectral filter array may be increased resulting in a reduced manufacturing difficulty and enabling manufacture using an additive process (e.g., a liftoff process). Based on reducing a difficulty of manufacture, some implementations described herein may enable an increased quantity of channels for a multispectral filter array. Based on including a threshold amount of hydrogenated silicon (e.g., a threshold thickness of hydrogenated silicon, a threshold quantity of layers of hydrogenated silicon, etc.), some implementations described herein may be associated with a relatively high refractive index, which may cause a relatively low angle-shift.

FIG. 1 is a diagram of an overview of an example implementation 100 described herein. As shown in FIG. 1, a multispectral filter 105 (e.g., a binary structure optical filter array) may include a first mirror 110-1, a second mirror 110-2, and a spacer 120.

As further shown in FIG. 1, first mirror 110-1 and second mirror 110-2 may sandwich spacer 120. In other words, spacer 120 may separate first mirror 110-1 and second mirror 110-2 by a threshold distance, and/or faces of spacer 120 may be enclosed by first mirror 110-1 and second mirror 110-2. In some implementations, mirrors 110 may be associated with a particular material. For example, mirrors 110 may include a set of metal mirror layers (e.g., silver), a set of dielectric mirror layers (e.g., alternating hydrogenated silicon layers and silicon dioxide layers), or the like to reflect a portion of light directed from a light source toward sensor elements associated with multispectral filter 105. Mirrors 110 may align with each sensor element of a sensor element array associated with each channel of multispectral filter 105.

In some implementations, spacer 120 may include one or more spacer layers 130. For example, spacer 120 may include a set of spacer layers 130-1 through 130-5 (e.g., dielectric layers). In some implementations, a thickness of one or more spacer layers 130 may be associated with ensuring a minimum spacer thickness for a particular wavelength. In some implementations, spacer 120 may be associated with a single cavity configuration. Additionally, or alternatively, spacer 120 may be associated with a multi-cavity configuration.

In some implementations, a thickness of one or more spacer layers 130 may be related based on a binary progression. For example, spacer layer 130-3 may be associated with a thickness of approximately half a thickness of spacer layer 120-2, spacer layer 130-4 may be associated with a thickness of approximately half the thickness of spacer layer 130-3, and spacer layer 130-5 may be associated with a thickness of approximately half the thickness of spacer layer 130-4.

In some implementations, multispectral filter 105 may be deposited onto a substrate associated with an optical sensor device. For example, mirror 110-1 may be deposited (e.g., via a deposition process and/or a photolithographic lift-off process) onto a substrate that includes an array of sensor elements to capture information (e.g., spectral data). In some implementations, spacer 120 may permit capture of information relating to multiple wavelengths. For example, a first portion of spacer 120 aligned with a first sensor element (e.g., a back illuminated optical sensor or a front illuminated optical sensor of a sensor element array) may be associated with a first thickness and a second portion of spacer 120 aligned with a second sensor element may be associated with a second thickness. In this case, light, which is directed toward the first sensor element and the second sensor element, may correspond to a first wavelength at the first sensor element based on the first thickness and a second wavelength at the second sensor element based on the second thickness. In this way, multispectral filter 105 permits multispectral sensing by an optical sensor device using a spacer (e.g., spacer 120) associated with multiple portions, which are associated with multiple thicknesses, aligned to multiple sensor elements of the optical sensor device.

In some implementations, mirrors 110 may be associated with a protective layer. For example, a protective layer may be deposited onto mirror 110-1 (e.g., between mirror 110-1 and spacer 120) to reduce a likelihood of degradation of mirror 110-1, thereby improving durability of an optical sensor device utilizing multispectral filter 105. In some implementations, mirrors 110 and/or spacer 120 may be associated with a tapered edge. For example, an edge portion of mirror 110 and/or spacer 120 may be tapered and may permit another layer (e.g., a protective layer) to be deposited on the edge portion to reduce a likelihood of degradation of the edge portion without obstructing another portion of mirror 110 and/or spacer 120 (e.g., a non-edge portion) associated with directing light toward an optical sensor, thereby improving durability of an optical sensor device utilizing multispectral filter 105.

As indicated above, FIG. 1 is provided merely as an example. Other examples are possible and may differ from what was described with regard to FIG. 1.

FIGS. 2A-2D are diagrams of examples relating to a Fabry-Perot filter using hydrogenated silicon for a spacer layer and with two quarterwave stacks of high refractive index/low refractive index (HL) pairs.

As shown in FIG. 2A, and by chart 200, a filter 210 may include a substrate, a first quarterwave stack including alternating hydrogenated silicon (shown as "Si_H" or termed Si:H) layers and silicon dioxide (shown as "SiO2")

layers, a hydrogenated silicon spacer, and a second quarterwave stack including alternating hydrogenated silicon layers and silicon dioxide layers. The hydrogenated silicon layers of the first quarterwave stack and the second quarterwave stack may each be associated with a refractive index of approximately 3.7226, a physical thickness of approximately 62.6 nm, and a quarterwave optical thickness (shown as "Q.W.O.T.") of approximately 932 nm. Quarterwave optical thickness of a layer corresponds to the physical thickness and refractive index of the layer, as described herein. The silicon dioxide layers of the first quarterwave stack and the second quarterwave stack may each be associated with a refractive index of approximately 1.4664, a physical thickness of approximately 158.9 nm, and a quarterwave optical thickness of approximately 932 nm. The hydrogenated silicon spacer layer is associated with a refractive index of approximately 3.7226, a physical thickness of approximately 125.2 nm, and a quarterwave optical thickness of approximately 1864 nm. Although described herein as a hydrogenated silicon spacer layer, the hydrogenated silicon spacer layer may include multiple spacer layers of hydrogenated silicon of multiple thicknesses selected to form multiple channels. For example, in a first case, the hydrogenated silicon spacer layer may be formed using multiple layers to form 64 channels. Similarly, in a second case, the hydrogenated silicon spacer layer may be formed using multiple layers to form 128 channels.

Figure 2B:
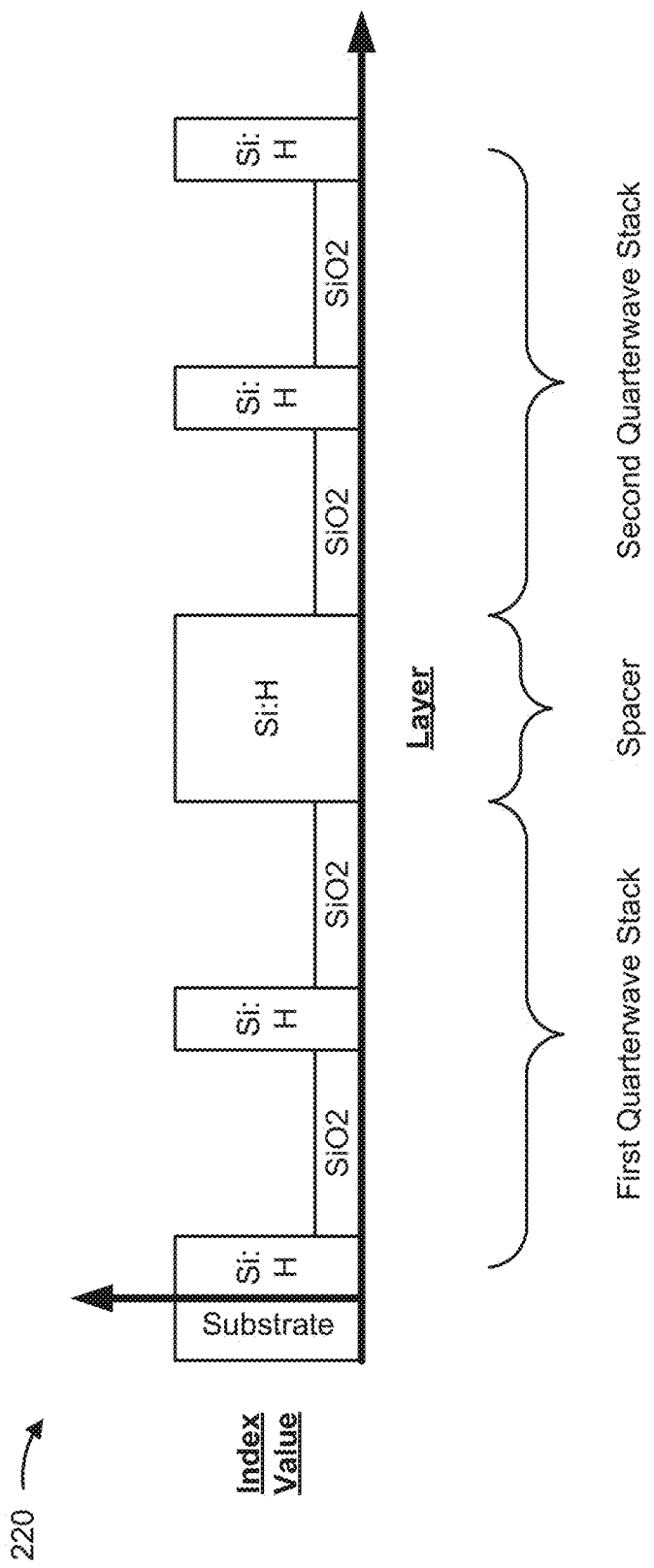

As shown in FIG. 2B, chart 220 represents a refractive index profile of filter 210. As shown, filter 210 includes a hydrogenated silicon spacer sandwiched by a first quarterwave stack and a second quarterwave stack. Each of the first quarterwave stack and the second quarterwave stack includes an alternating set of hydrogenated silicon layers and silicon dioxide layers forming a set of HL pairs.

Figure 2C:
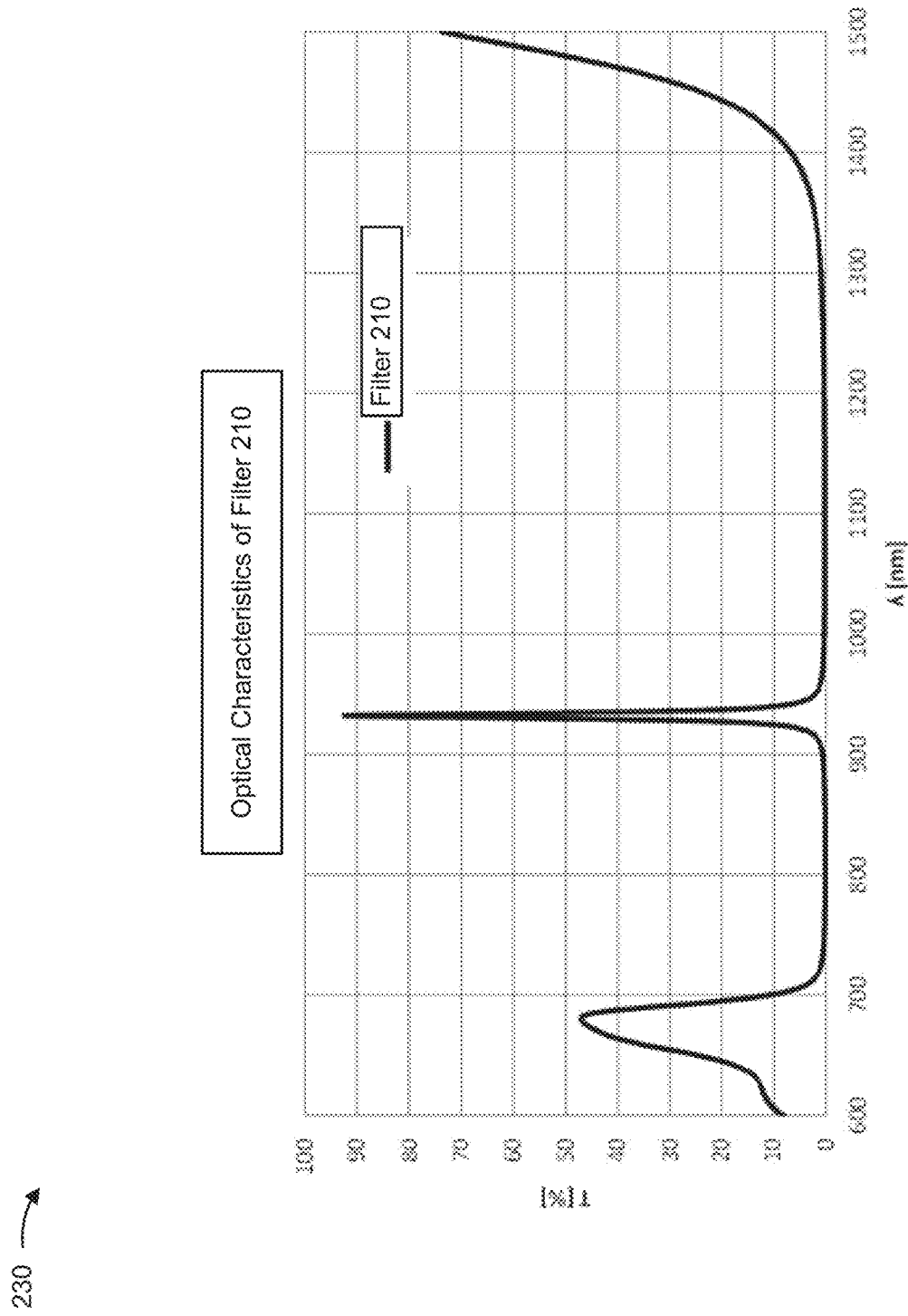
Figure 2D:
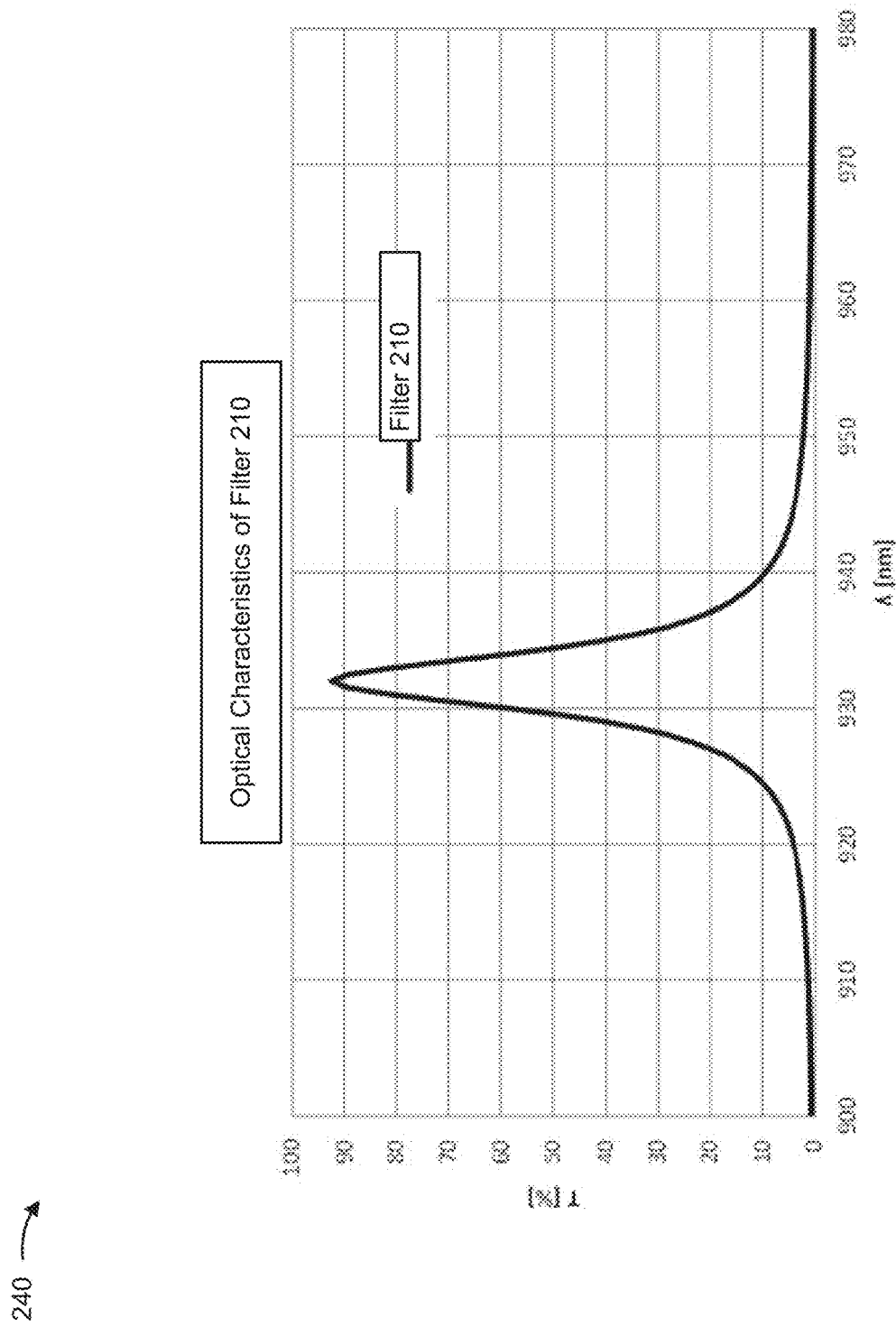

As shown in FIGS. 2C and 2D, a set of charts 230 and 240, respectively, show a set of optical characteristics of filter 210. For example, filter 210 is associated with a transmittance of greater than 90% at approximately 932 nm. Similarly, filter 210 is associated with a transmittance of greater than 45% at approximately 680 nm. In this case, filter 210 may be utilized for, for example, a wavelength range of between approximately 800 nm and approximately 1100 nm. In one case, as described herein, filter 210 may be provided for a 64 channel sensor element array, and may be associated with a thickness for a thinnest layer of the hydrogenated silicon spacer of approximately 1.2 nm. Similarly, in a second case, as described herein, filter 210 may be provided for a 128 channel sensor element array, and may be associated with a thickness for a thinnest layer of the hydrogenated silicon spacer of approximately 0.6 nm. Based on the thickness of the thinnest layer being less than a threshold layer thickness (e.g., less than approximately 5 nm, less than approximately 2 nm, less than approximately 1.5 nm, less than approximately 1 nm, less than approximately 0.75 nm, etc.), one or more layers of the hydrogenated silicon spacer may oxidize into one or more mixed hydrogenated silicon and oxide layers. Based on the thickness of the one or more hydrogenated silicon and oxide layers being selected based on intending to use only hydrogenated silicon, the hydrogenated silicon spacer may be termed as an uncontrolled composition spacer or a hydrogenated silicon only spacer.

As indicated above, FIGS. 2A-2D are provided merely as examples. Other examples are possible and may differ from what was described with regard to FIGS. 2A-2D.

FIGS. 3A-3D are diagrams of optical characteristics of a Fabry-Perot filter using hydrogenated silicon only as a spacer (i.e., an uncontrolled composition spacer), such as a filter 210, described with regard to FIGS. 2A-2D.

Figure 3A:
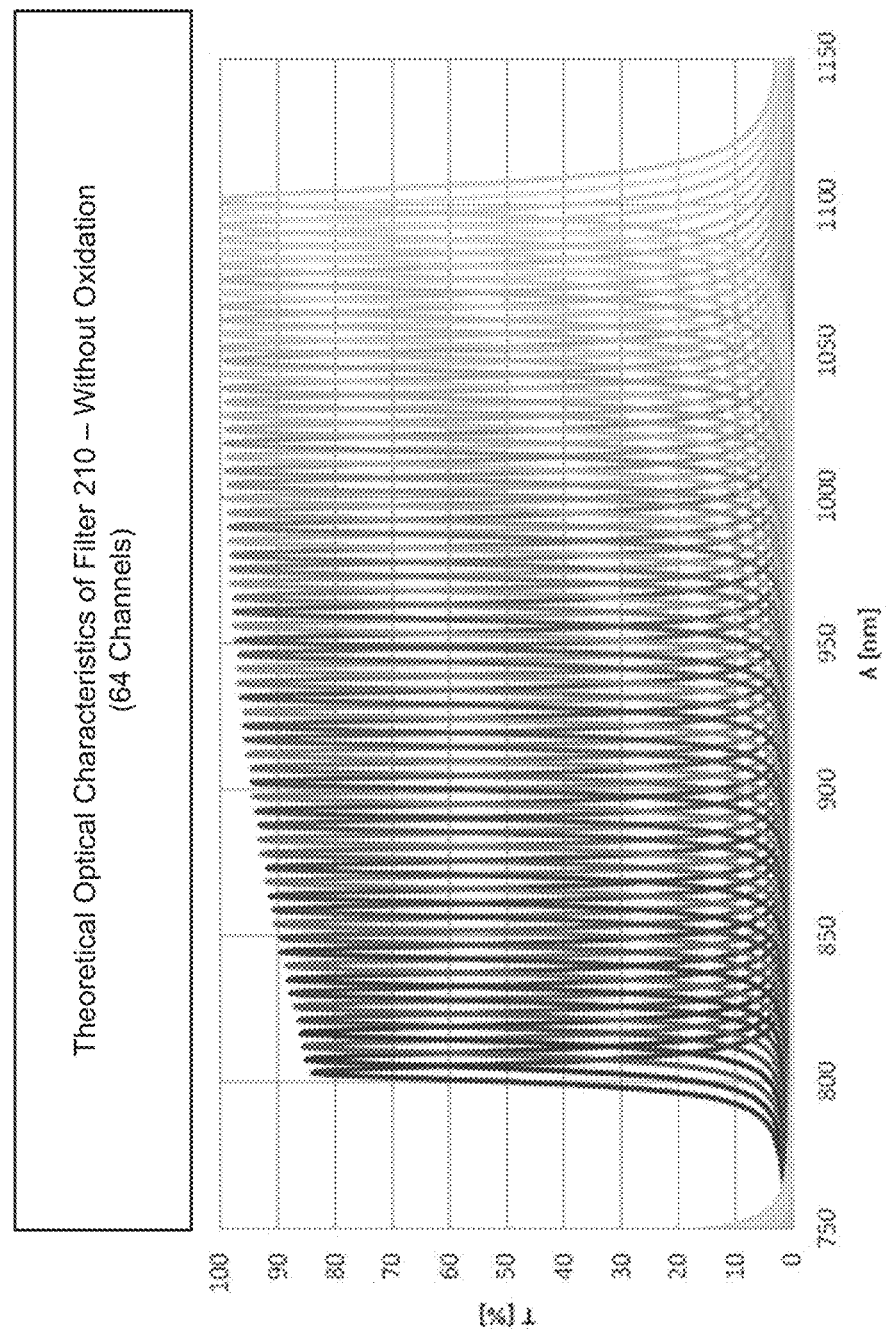
FIGS. 3A-3D are diagrams of characteristics relating to a multispectral filter described herein.

As shown in FIG. 3A, and by chart 300, a theoretical case filter response is provided for a 64 channel filter array using a filter 210. The theoretical filter response is determined for a case without oxidation of the hydrogenated silicon spacer of filter 210. In this case, filter 210 provides a set of 64 approximately evenly spaced channels covering the wavelength range of approximately 800 nm to approximately 1100 nm, with the set of channels being associated with a transmittance of between approximately 80% and approximately 100%.

Figure 3B:
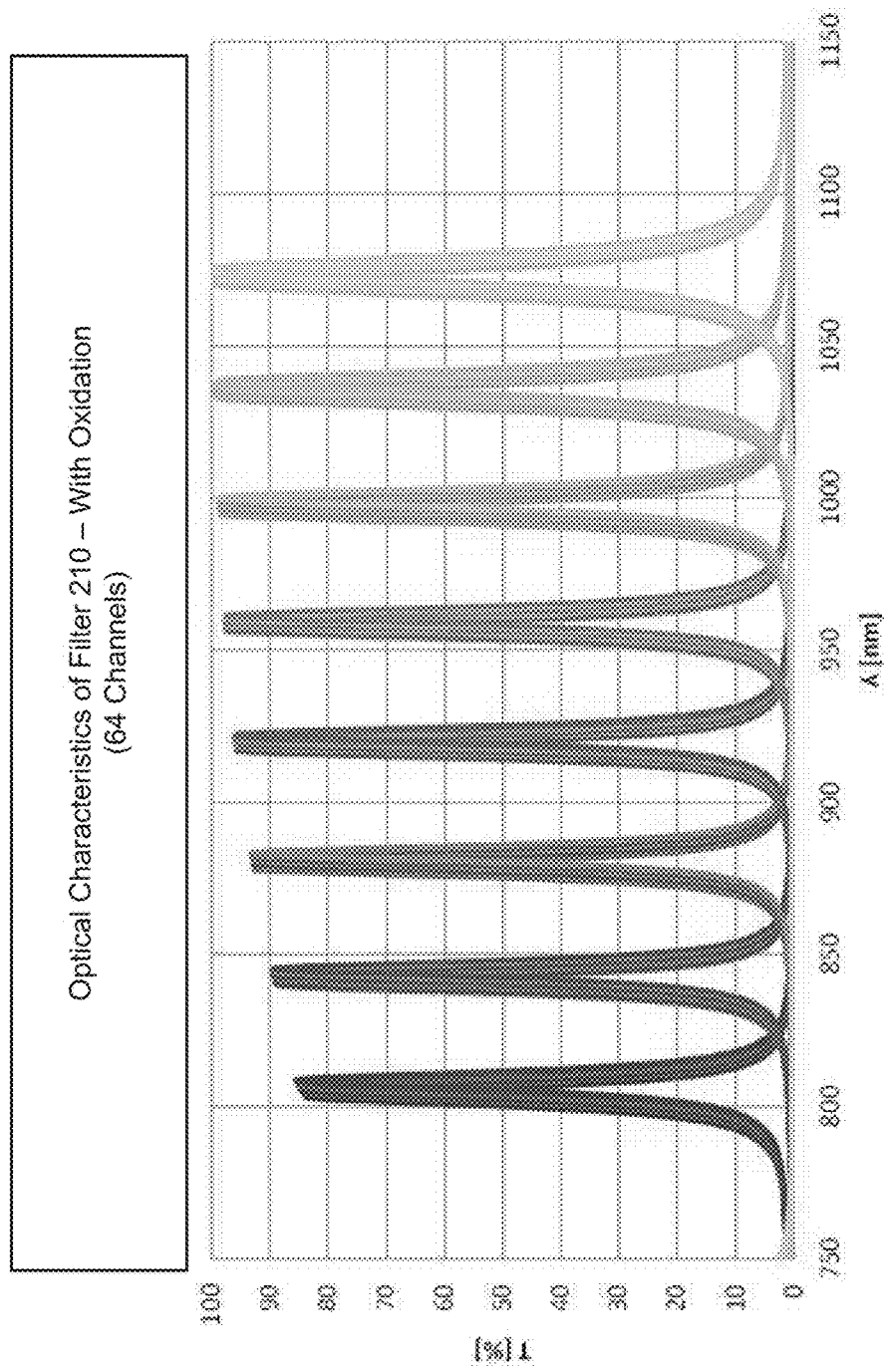

As shown in FIG. 3B, and by chart 310, an oxidized case filter response is provided for the 64 channel filter array using filter 210 based on oxidation of thin layers (e.g., layers of less than a threshold thickness) and surfaces of layers of the spacer of filter 210 (e.g., oxidation occurring during exposure to atmosphere, a patterning process, a cleaning process, etc., as described herein). In this case, oxidation is caused on, for example, the last three layers of the spacer of filter 210 (e.g., the thinnest three layers up to a thickness of approximately 4.8 nm), which are oxidized to form mixed hydrogenated silicon/silicon dioxide layers. As a result, filter 210 provides a set of 64 channels, with groups of channels being associated with relatively similar wavelengths. For example, a first group of 8 channels is associated with a wavelength of approximately 810 nm, a second group of channels is associated with a wavelength of approximately 845 nm, a third group of channels is associated with a wavelength of approximately 875 nm, etc. as a result of oxidation altering a composition and a refractive index of the last three layers of the spacer of filter 210 without an alteration to a physical thickness of last three layers of the spacer.

Figure 3C:
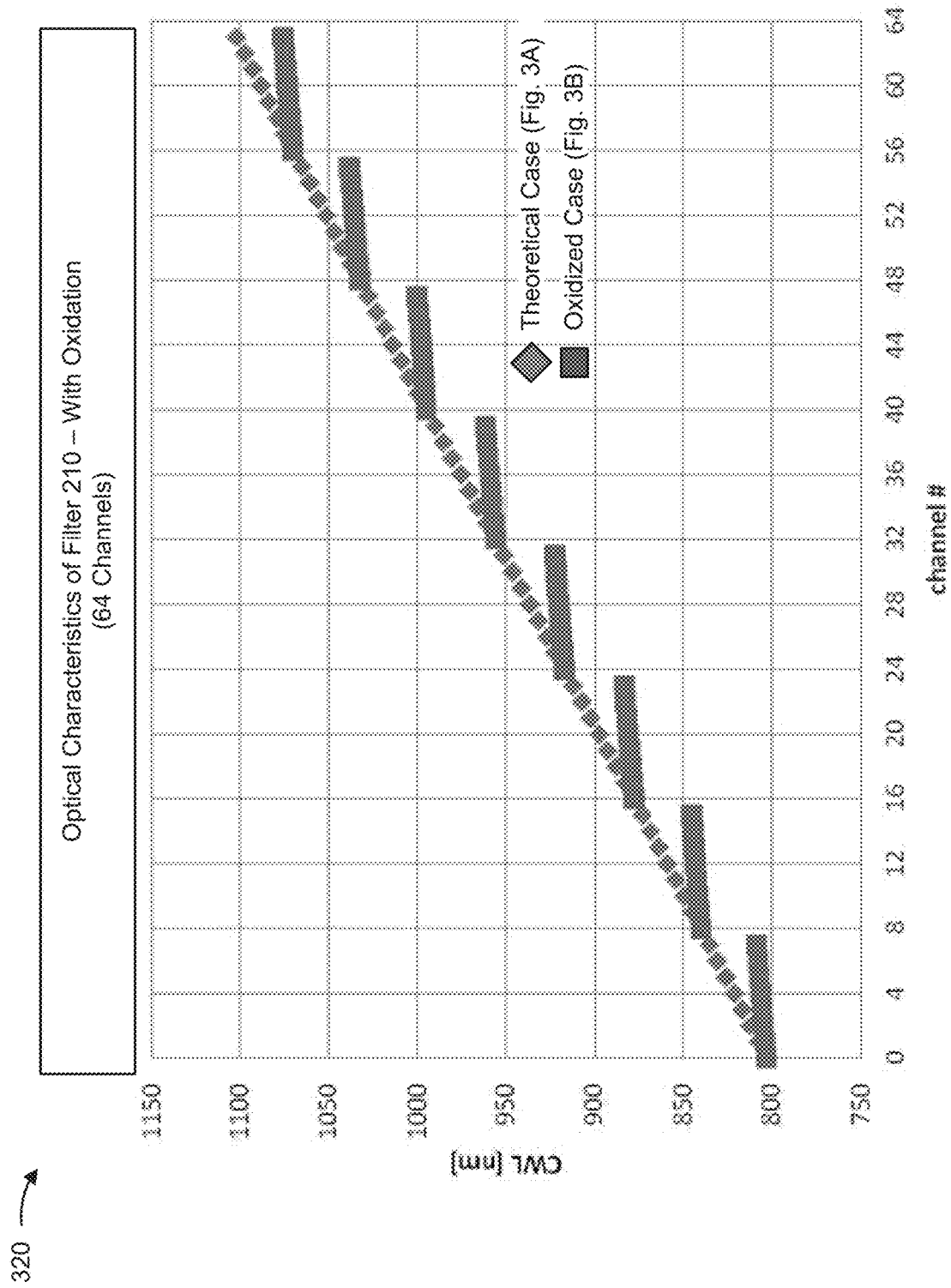
Figure 3D:
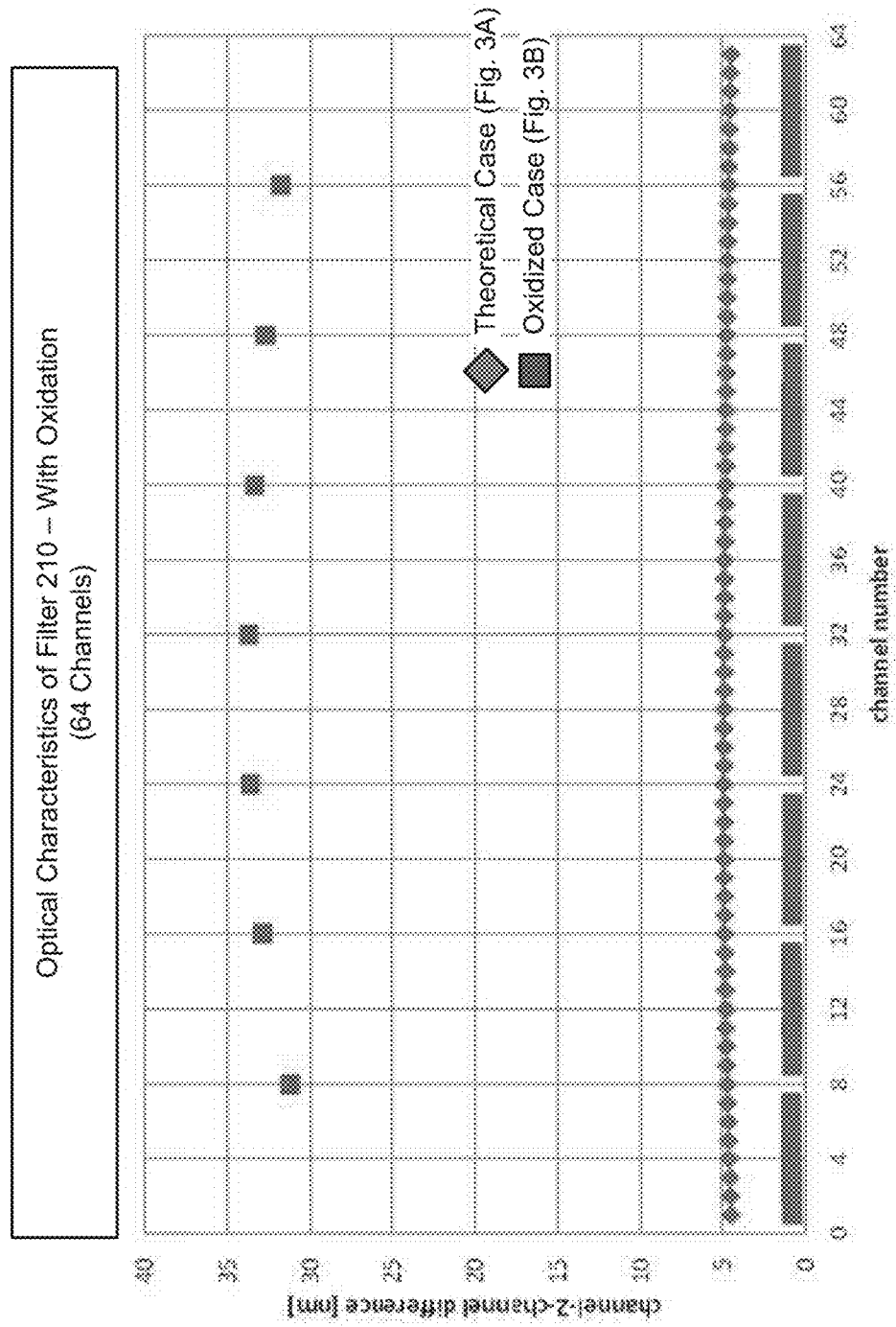

As shown in FIG. 3C, and by chart 320, and in FIG. 3D, and by chart 330, a comparison is provided between the filter response of filter 210 in the theoretical case of FIG. 3A and the filter response in the oxidized case of FIG. 3B for each channel. As shown in FIG. 3C, rather than an evenly spaced set of center wavelengths (shown as "CWL") in the theoretical case, filter response in the oxidized case results in groupings of relatively similar center wavelengths (e.g., groups of 8 channels each with a center wavelength within approximately 2 nm of each other channel in the group). For example, as shown in FIG. 3D, in the theoretical case, a center wavelength of any particular channel is spaced from adjacent center wavelengths of adjacent channels by approximately 5 nm. In other words, for example, channel 16 is associated with a center wavelength 5 nm higher than channel 15 and 5 nm lower than channel 17. In contrast, in the oxidized case, channels within a group of channels are associated with a relatively low channel spacing and each group is associated with a relatively high channel spacing. In other words, for example, channels 6 and 7 are in a common channel group and channel 7 is associated with a center wavelength 1 nm higher than channel 6; however, channels 7 and 8 are associated with different channel groups, and channel 7 is associated with a center wavelength approximately 32 nm lower than channel 8.

As indicated above, FIGS. 3A-3D are provided merely as examples. Other examples are possible and may differ from what was described with regard to FIGS. 3A-3D.

FIGS. 4A-4E are diagrams of examples relating to a filter using a mixed spacer layer using an oxide based material for one or more deposition layers of the mixed spacer layer.

As shown in FIG. 4A, and by chart 400, a filter 410 (e.g., an optical filter for multispectral sensing) may include a first mirror, a set of layers of a spacer, and a second mirror. The first mirror and the second mirror may be quarterwave stack mirrors, metal mirrors, or the like. Layers of the spacer are deposited using a set of coating runs (identified as coating runs 1, 2, 3, ... ). Hydrogenated silicon (e.g., which may be associated with a refractive index greater than a threshold refractive index at a spectral range of between approximately 800 nm and approximately 1100 nm, such as greater than 2.0, greater than 2.5, greater than 3.0, greater than 3.5, greater than 3.6, or the like) or another material (e.g., another oxidizable material) may be selected for one or more layers of the spacer. An oxide may be used for one or more layers that are determined to be associated with a layer thickness less than a layer thickness threshold for hydrogenated silicon, such as less than approximately 5 nm. In other words, if a layer would be associated with a thickness less than a threshold were the layer to be deposited using hydrogenated silicon (e.g., based on a refractive index of hydrogenated silicon at a spectral range that is to be covered by an optical device that includes filter 410), the layer may be deposited from an oxide material with another thickness (e.g., selected based on a refractive index of the oxide material), which in some implementations may be greater than the thickness threshold. In some implementations, the oxide material may be associated with a thickness less than the thickness threshold.

In another example, another threshold layer thickness may be utilized such as less than approximately 10 nm, less than approximately 2.5 nm, less than approximately 2 nm, less than approximately 1.5 nm, less than approximately 1 nm, less than approximately 0.75 nm, or the like. In this case, a first layer (identified as coating run 1) is associated with a layer thickness for hydrogenated silicon of approximately 92.633 nm, which exceeds the threshold layer thickness, and is thus deposited using hydrogenated silicon. Similarly, a fourth layer is associated with a layer thickness for hydrogenated silicon of approximately 9.617 nm, which exceeds the threshold layer thickness, and is thus deposited using hydrogenated silicon. In contrast, a fifth layer is associated with a layer thickness for hydrogenated silicon of approximately 4.809 nm, which does not exceed the threshold layer thickness. In this case, niobium titanium oxide (NbTiOx) is deposited with a layer thickness of approximately 11.800 nm (e.g., based on a refractive index of niobium titanium oxide) rather than hydrogenated silicon.

In another example, another oxide material may be utilized, such as silicon dioxide (SiO2), niobium pentoxide (Nb$_2$O$_5$), tantalum pentoxide (Ta$_2$O$_5$), titanium dioxide (TiO$_2$), aluminum oxide (Al$_2$O$_3$), zirconium oxide (ZrO$_2$), yttrium oxide (Y$_2$O$_3$), hafnium dioxide (HfO$_2$), or the like; a nitride material may be used, such as silicon nitride (Si$_3$N$_4$); a fluoride material may be used, such as magnesium fluoride (MgF); a sulfide material may be used, such as zinc sulfide (ZnS); a selenide material may be used, such as zinc selenide (ZnSe); a combination thereof; or the like. Based on niobium titanium oxide being associated with a different refractive index than hydrogenated silicon, a different layer thickness is selected to deposit the fifth layer using niobium titanium oxide. For example, a layer thickness of approximately 11.800 nm is selected for the fifth layer of the spacer based on the refractive index of niobium titanium oxide and a center wavelength for channels associated with the fifth layer. Similarly, a sixth layer and a seventh layer are associated with a layer thickness for hydrogenated silicon of approximately 2.404 nm and approximately 1.202 nm, respectively, which do not exceed the threshold layer thickness. In this case, the sixth layer and the seventh layer are deposited using niobium titanium oxide with a layer thickness of approximately 5.900 nm and approximately 2.950 nm, respectively, based on the refractive index of niobium titanium oxide and a center wavelength for channels associated with the sixth layer and the seventh layer. In some implementations, filter 410 may be associated with a threshold quantity of channels formed by layers of the spacer, such as greater than or equal to 8 channels, 16 channels, 32 channels, 64 channels, 128 channels, 256 channels, or the like.

With regard to a thickness of a second material for a spacer (e.g., the first material being, for example, hydrogenated silicon), the thickness is different from an expected thickness based on dispersion values. For example, at approximately 930 nm, hydrogenated silicon is associated with a refractive index of approximately 3.7225 and a spacer thickness of 1.202 for the seventh layer, resulting in an optical thickness of 3.7225*1.202=4.474 nm, which represents an optical thickness of a hydrogenated silicon layer. A theoretical physical thickness of the niobium titanium oxide layer to replace the hydrogenated silicon layer can be determined as 4.474 nm/2.323 nm=1.926 nm, where 2.323 nm represents an approximate refractive index of niobium titanium oxide at approximately 930 nm. In this case, 1.926 nm is less than the physical thickness, 2.950 nm, that is determined based on dispersion. This difference is a result of a phase shift at an interface between hydrogenated silicon and, for example, niobium titanium oxide. Thus, based on testing, niobium titanium oxide is determined to increase a layer thickness by 250% relative to hydrogenated silicon. In this way, manufacturability of a mixed spacer based filter (e.g., filter 410) using a controlled composition is improved relative to another filter (e.g., filter 210) using an uncontrolled composition, based on increasing a thickness of the thinnest layers of the filter and based on enabling manufacture of a filter array using an additive process.

Figure 4B:
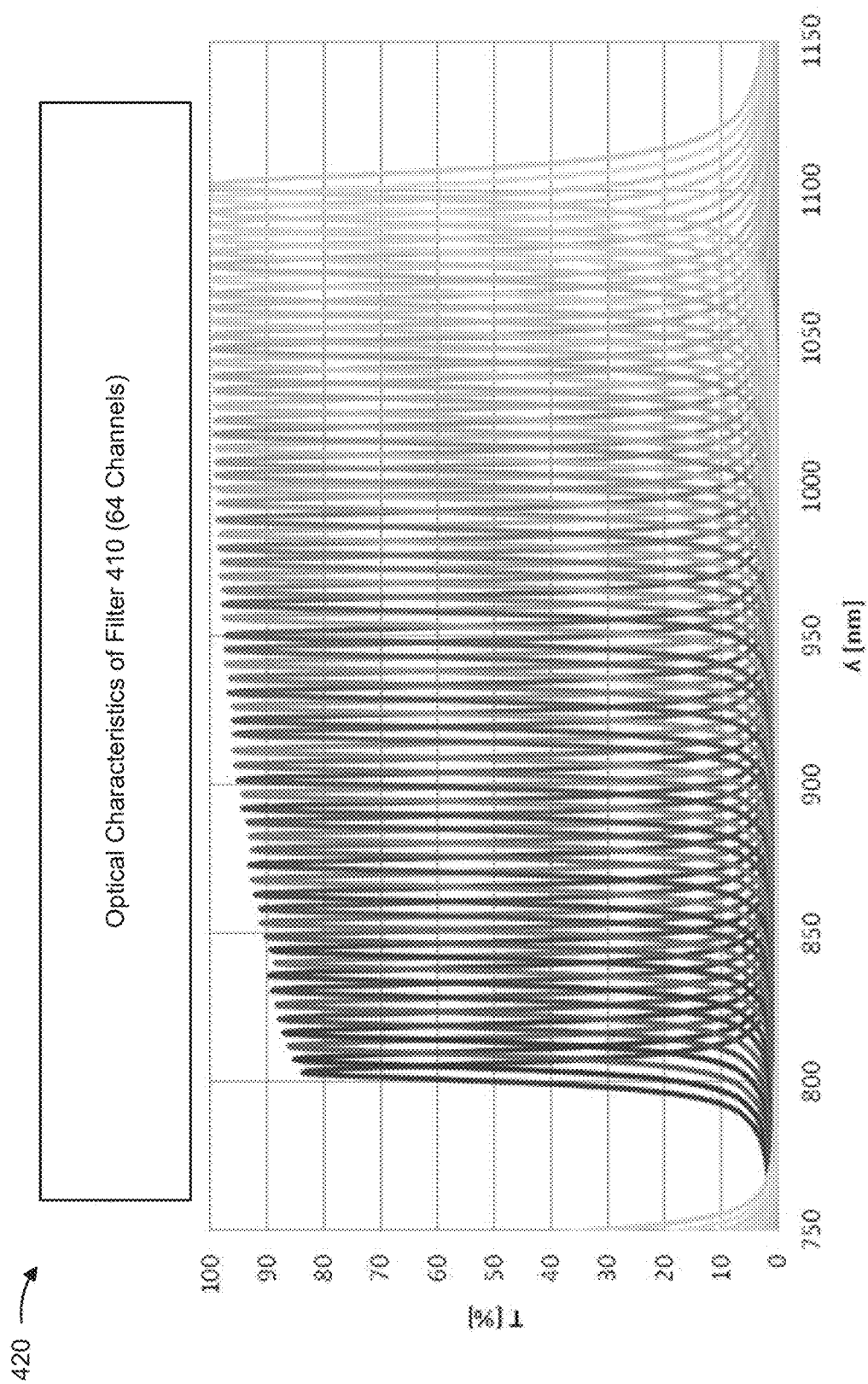

As shown in FIG. 4B, and by chart 420, a filter response is provided for a 64 channel filter array using filter 410. In this case, based on utilizing a mixed spacer layer with oxide layers and hydrogenated silicon layers, filter 410 provides a set of 64 approximately evenly spaced channels covering the wavelength range of approximately 800 nm to approximately 1100 nm, with the set of channels being associated with a transmittance of between approximately 80% and approximately 100%. Use of oxide layers rather than hydrogenated silicon layers of less than a threshold layer thickness avoids oxidation, which avoids the grouping of channels shown in FIG. 3B. In this way, utilization of a mixed spacer improves filter performance of a multispectral filter, and improves optical performance of an optical device that includes filter 410 relative to an all hydrogenated silicon spacer based design.

Figure 4C:
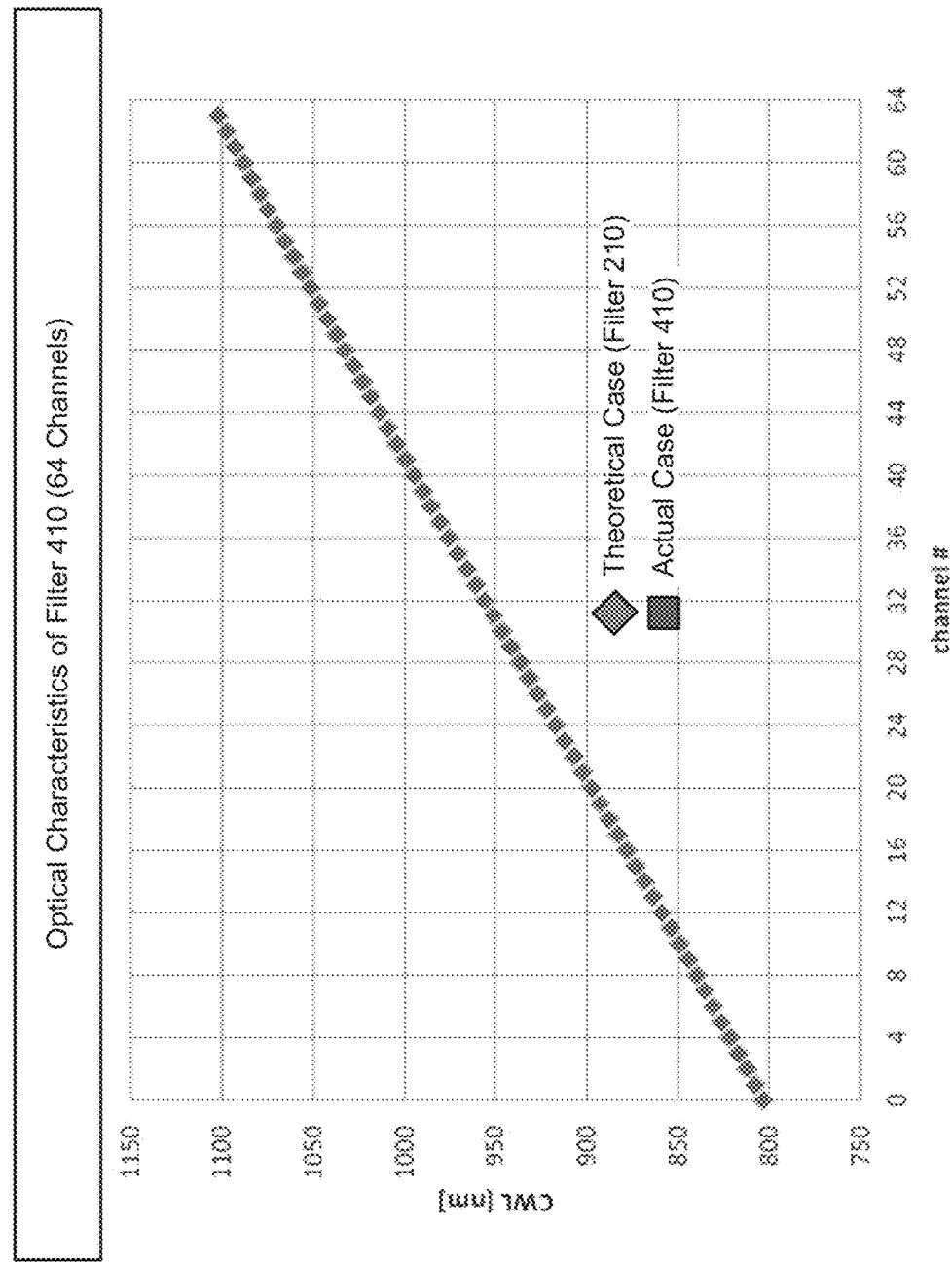
Figure 4D:
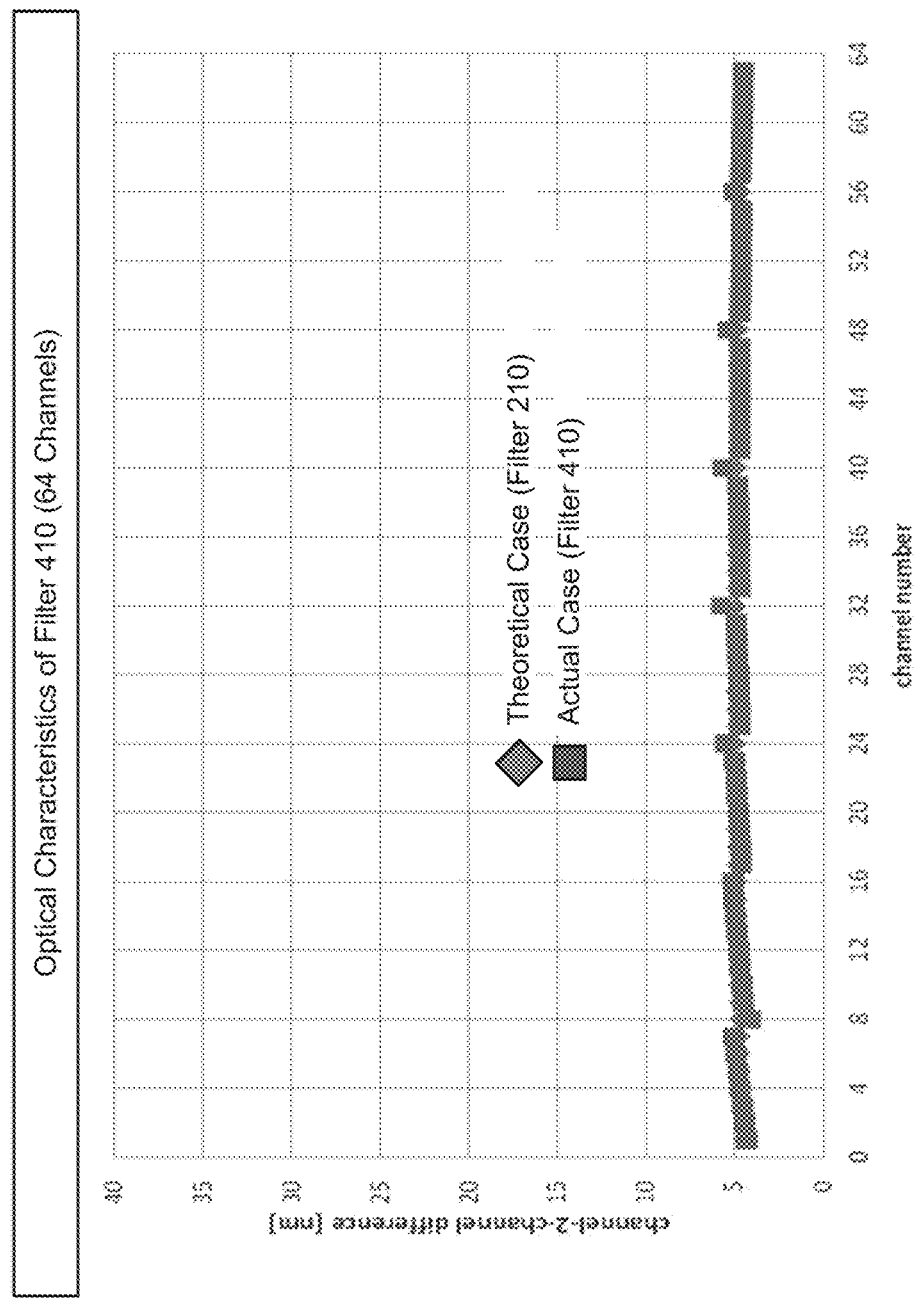
Figure 4E:
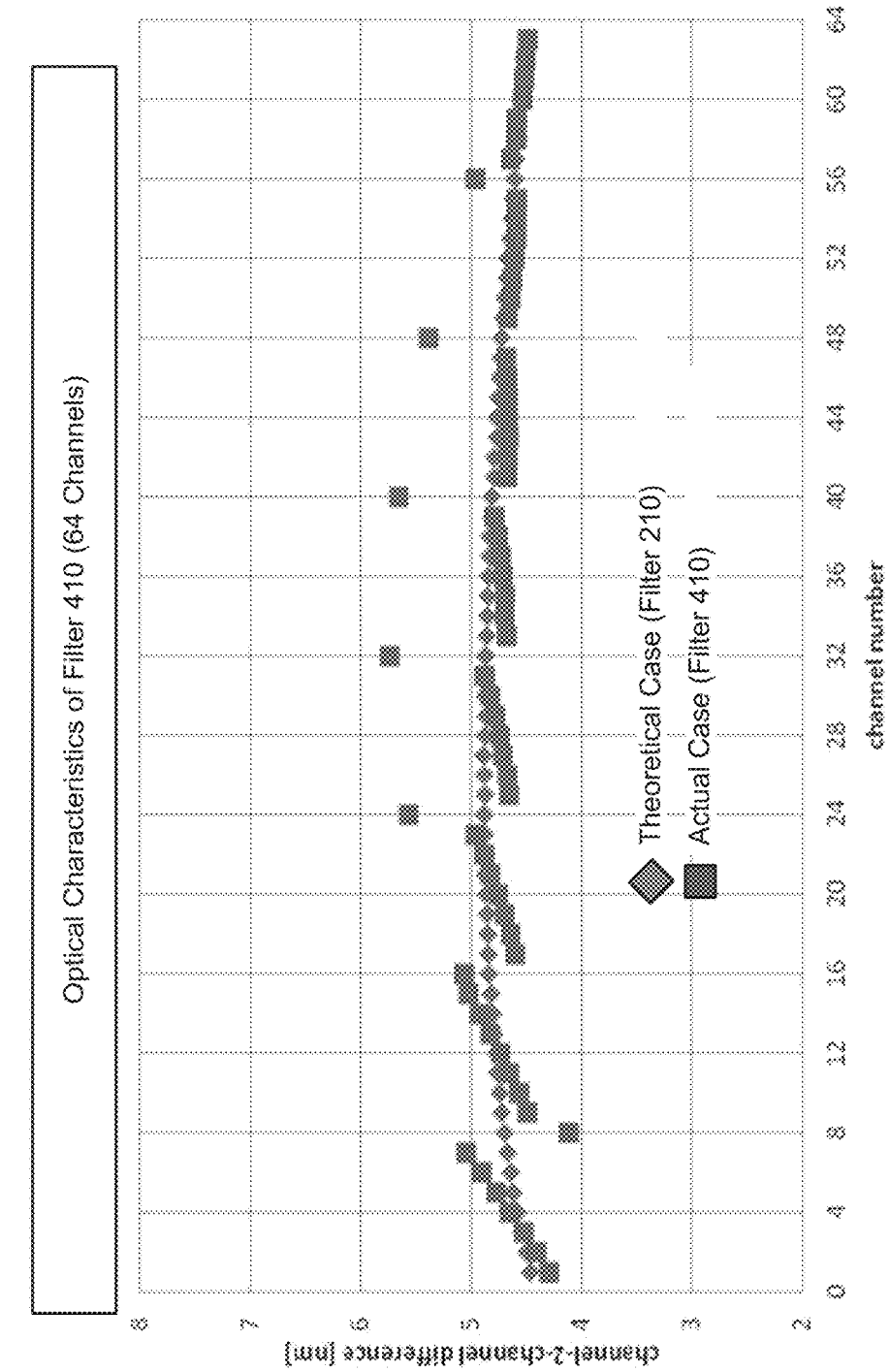

As shown in FIG. 4C, and by chart 430; FIG. 4D, and by chart 440; and FIG. 4E, and by chart 450, filter 410 results in a relatively even spacing of center wavelengths of channels of filter 410 (e.g., a center wavelength spacing that is associated with a deviation of less than a threshold separation for each channel, such as less than approximately 10 nm, less than approximately 6 nm, less than approximately 5 nm, or the like). For example, as shown by chart 430, center wavelengths for filter 410 correspond to the theoretical case for filter 210 from a center wavelength of 800 nm at channel index number 0 to a center wavelength of 1100 nm for channel index number 63. Similarly, as shown by chart 440, and at a more granular scale by chart 450, the theoretical case for filter 210 is associated with a channel spacing of between approximately 4.5 nm and approximately 5 nm. In contrast, returning to chart 330 in FIG. 3D, in an oxidized case, filter 210 is associated with a channel spacing of between approximately 0.5 nm (e.g., for adjacent channels of a channel group) and approximately 35 nm (e.g., for adjacent channels of different channel groups). Returning to charts 440 and 450, filter 410 in the actual case is associated with a channel spacing of between approximately 4 nm and approximately 6 nm. In this way, an improvement in a uniformity of channel spacing is achieved by filter 410 relative to filter 210.

As indicated above, FIGS. 4A-4E are provided merely as examples. Other examples are possible and may differ from what was described with regard to FIGS. 4A-4E.

FIGS. 5A and 5B are diagrams relating to a filter with a mixed spacer using an oxide based material for one or more optical filter layers of the mixed spacer.

As shown in FIG. 5A, and by chart 500; and in FIG. 5B, and by chart 510, a refractive index is provided for a set of spacer materials at a set of wavelengths of light. For example, as shown in chart 500, a refractive index of hydrogenated silicon at approximately 800 nm is approximately 3.852, at approximately 930 nm is approximately 3.7225, and at 1100 nm is approximately 3.639. Similarly, for niobium titanium oxide and silicon dioxide, respective refractive indices at approximately 800 are approximately 2.342 and approximately 1.469, at approximately 930 nm are approximately 2.323 and approximately 1.466, and at 1100 nm are approximately 2.308 and approximately 1.464.

As shown in chart 510, a change in refractive index for a change in wavelength is different for niobium titanium oxide and silicon dioxide relative to hydrogenated silicon. For example, hydrogenated silicon is associated with a reduction of approximately 3.4% and approximately 5.5% in refractive index at a change in wavelength from approximately 800 nm to approximately 930 nm and approximately 1100 nm, respectively. In contrast, niobium titanium oxide is associated with a reduction of approximately 0.8% and approximately 1.5%, and silicon dioxide is associated with a reduction or approximately 0.2% and approximately 0.3%. In this case, a result of the mismatch between the change in refractive index of hydrogenated silicon and the change in refractive index of niobium titanium oxide or silicon dioxide is a change to a uniformity in channel spacing. For example, returning to chart 450, channel spacing for filter 410 exhibits a deviation of linearity relative to the theoretical channel spacing for filter 210. This deviation of linearity is less than a threshold deviation. For example, filter 410 is associated with a channel separation of less than a threshold channel separation (e.g., less than approximately 6 nm).

As indicated above, FIGS. 5A and 5B are provided merely as examples. Other examples are possible and may differ from what was described with regard to FIGS. 5A and 5B.

FIGS. 6A-6D are diagrams relating to a filter with a mixed spacer using an oxide based material for one or more optical filter layers of the mixed spacer.

As shown in FIG. 6A, and by chart 600, a filter 610 (e.g., an optical filter for multispectral sensing) may include a first mirror, a set of layers of a spacer, and a second mirror. The first mirror and the second mirror may be quarterwave stack mirrors, metal mirrors, or the like. Layers of the spacer are deposited using a set of coating runs (identified as coating runs 1, 2, 3, . . . ). Hydrogenated silicon (e.g., which may be associated with a refractive index greater than a threshold refractive index at a spectral range of between approximately 800 nm and approximately 1100 nm, such as greater than 2.0, greater than 2.5, greater than 3.0, greater than 3.5, greater than 3.6, or the like) or another material (e.g., another oxidizable material) may be selected for one or more layers of the spacer. An oxide (e.g., silicon dioxide ($SiO_2$)) may be used for one or more layers that are determined to be associated with a layer thickness less than a layer thickness threshold for hydrogenated silicon, such as less than approximately 5 nm. In this case, a first layer (identified as coating run 1) is associated with a layer thickness for hydrogenated silicon of approximately 92.633 nm, which exceeds the threshold layer thickness, and is thus deposited using hydrogenated silicon. Similarly, a fourth layer is associated with a layer thickness for hydrogenated silicon of approximately 9.617 nm, which exceeds the threshold layer thickness, and is thus deposited using hydrogenated silicon. In contrast, a fifth layer is associated with a layer thickness for hydrogenated silicon of approximately 4.809 nm, which does not exceed the threshold layer thickness. In this case, silicon dioxide ($SiO_2$) is deposited with a layer thickness of approximately 30.400 nm (e.g., based on a refractive index of silicon dioxide oxide) rather than hydrogenated silicon.

Based on silicon dioxide being associated with a different refractive index than hydrogenated silicon, a different layer thickness is selected to deposit the fifth layer using silicon dioxide. For example, a layer thickness of approximately 30.4 nm is selected for the fifth layer of the spacer based on the refractive index of silicon dioxide and a center wavelength for channels associated with the fifth layer. Similarly, a sixth layer and a seventh layer are associated with a layer thickness for hydrogenated silicon of approximately 2.404 nm and approximately 1.202 nm, respectively, which do not exceed the threshold layer thickness. In this case, the sixth layer and the seventh layer are deposited using silicon dioxide with a layer thickness of approximately 15.2 nm and approximately 7.6 nm, respectively, based on the refractive index of silicon dioxide and a center wavelength for channels associated with the sixth layer and the seventh layer. In some implementations, filter 610 may be associated with a threshold quantity of channels formed by layers of the spacer, such as greater than or equal to 8 channels, 16 channels, 32 channels, 64 channels, 128 channels, 256 channels, or the like.

Figure 6B:
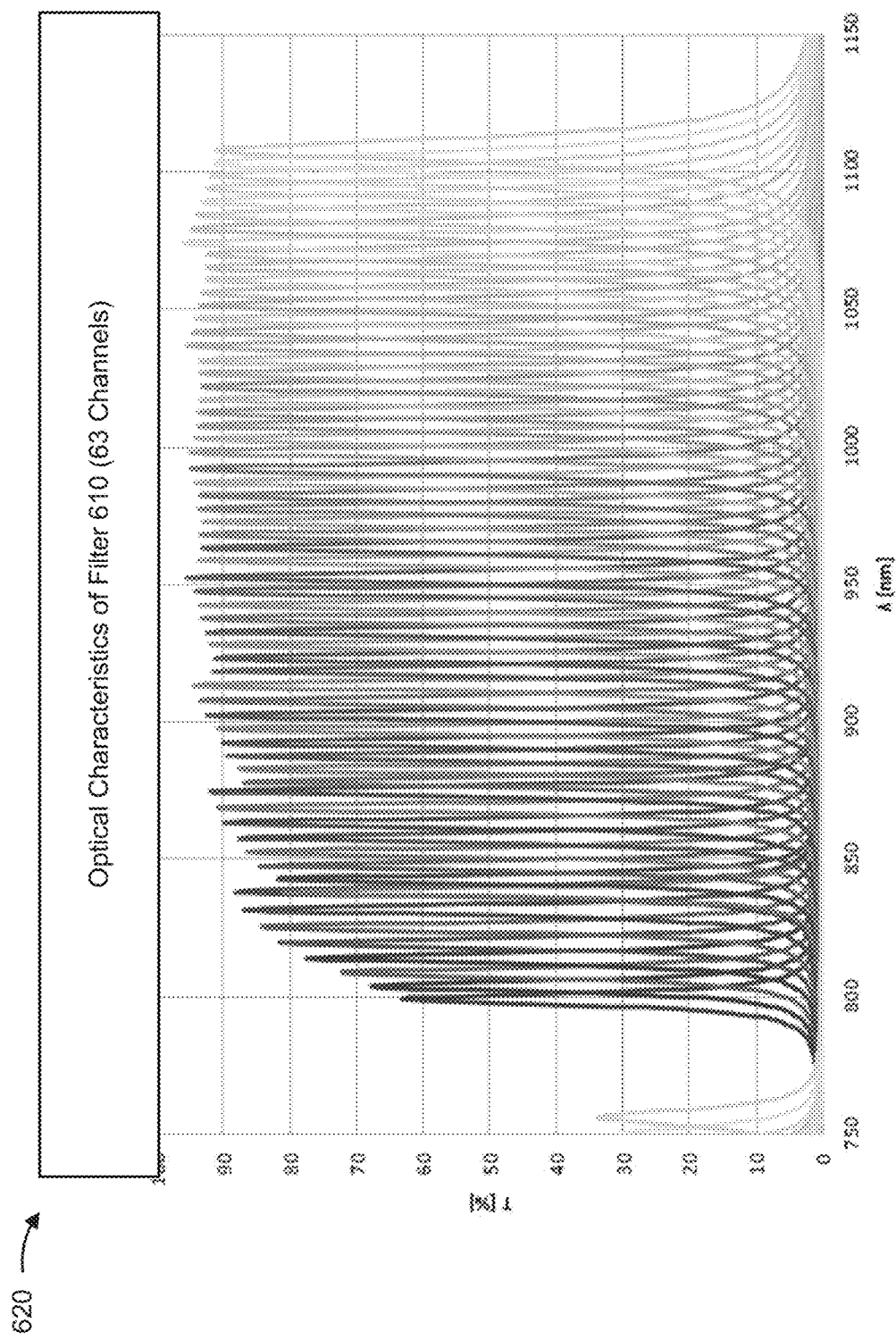

As shown in FIG. 6B, and by chart 620, a filter response is provided for a 63 channel filter array using filter 610. In this case, based on utilizing a mixed spacer layer with oxide layers and hydrogenated silicon layers, filter 610 provides a set of 63 approximately evenly spaced channels covering the wavelength range of approximately 800 nm to approximately 1100 nm, with the set of channels being associated with a transmittance of between approximately 60% and approximately 95%. Use of oxide layers rather than hydrogenated silicon layers of less than a threshold layer thickness avoids oxidation, which avoids the grouping of channels shown in, for example, FIG. 3B. In this way, utilization of a mixed spacer improves filter performance of a multispectral filter, and improves optical performance of an optical device that includes filter 610 relative to an all hydrogenated silicon spacer based design.

Figure 6C:
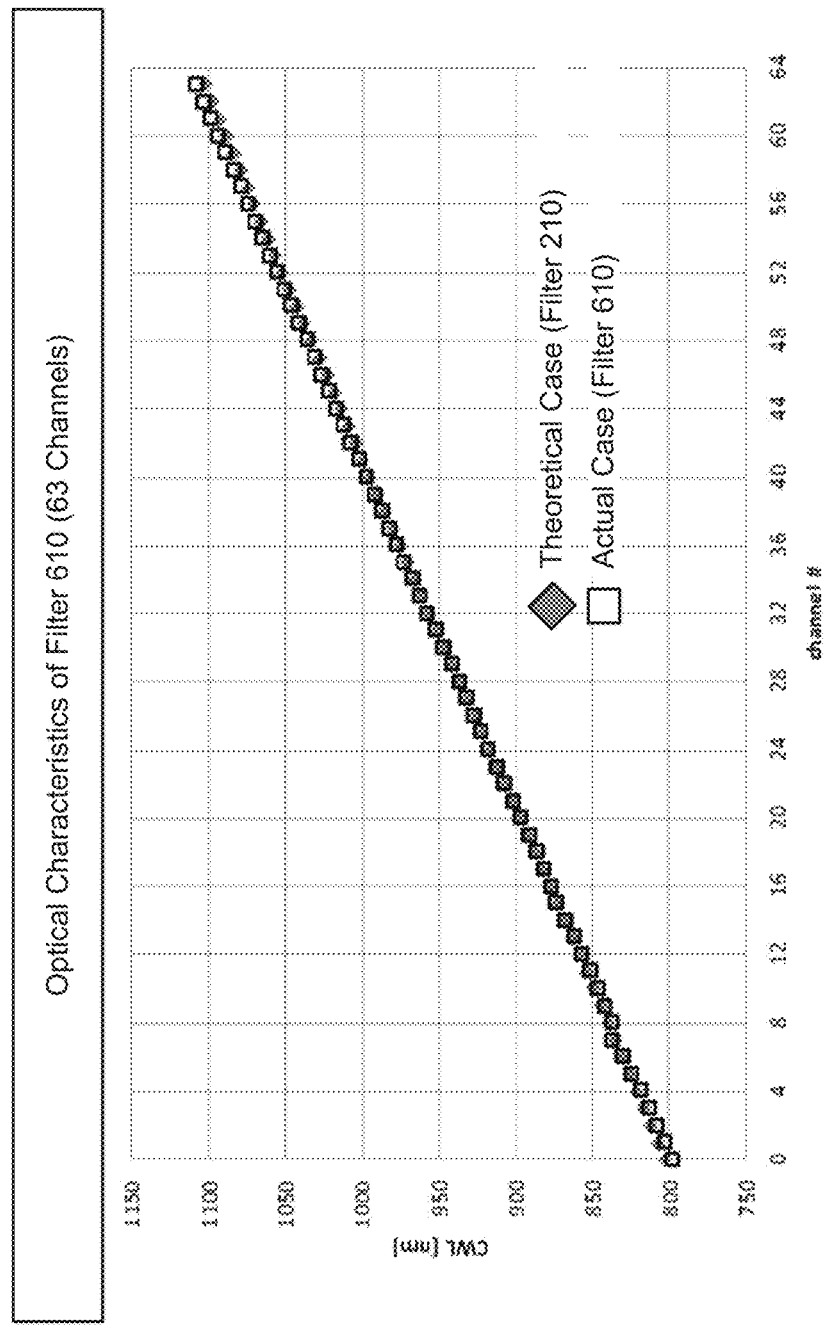
Figure 6D:
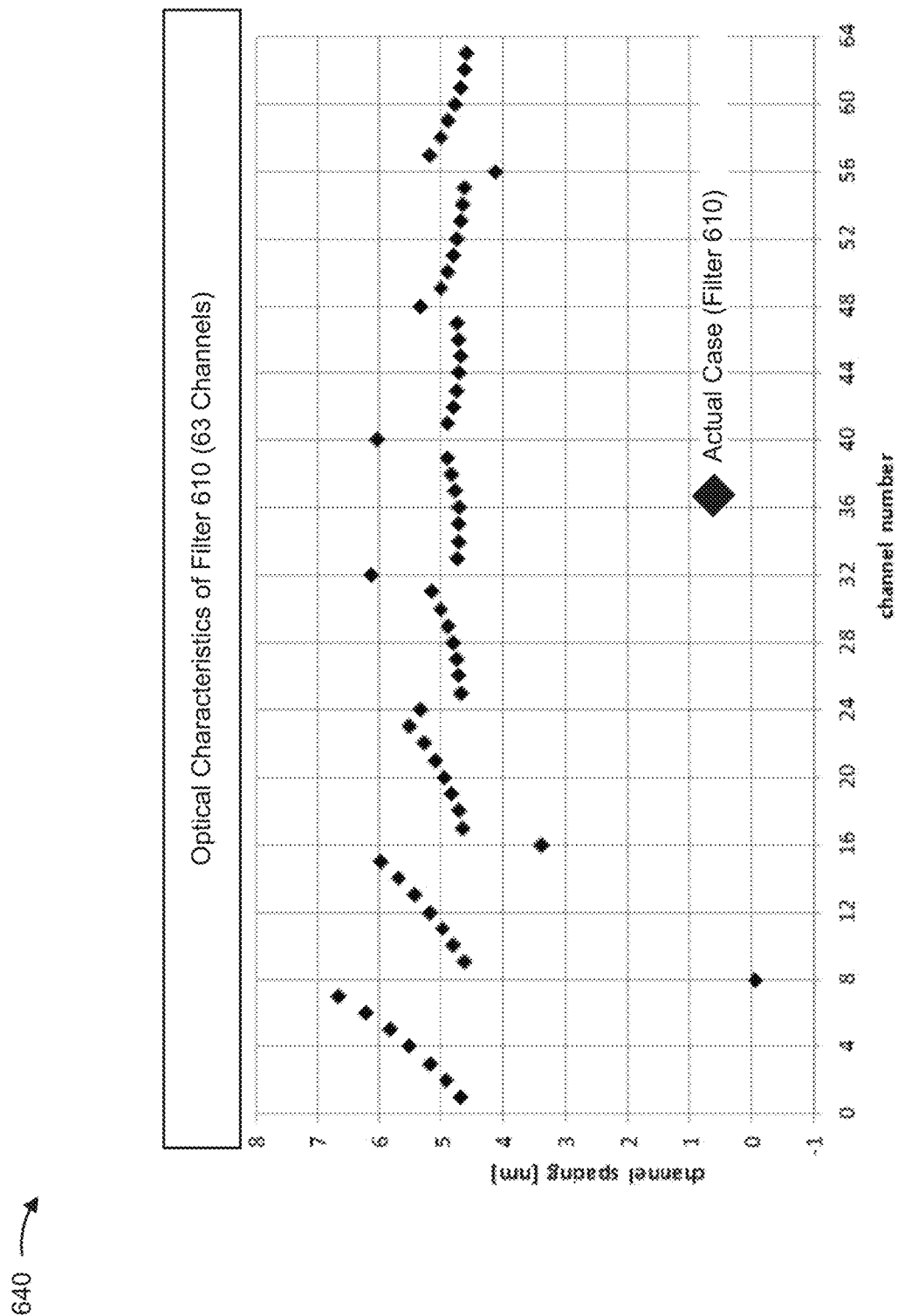

As shown in FIG. 6C, and by chart 630 and FIG. 6D, and by chart 640, filter 610 results in a relatively even spacing of center wavelengths of channels of filter 610 (e.g., a center wavelength spacing that is associated with a deviation of less than a threshold separation for each channel, such as less than approximately 10 nm, less than approximately 6 nm, less than approximately 5 nm, or the like). For example, as shown by chart 630, center wavelengths for filter 610 correspond to the theoretical case for filter 210 from a center wavelength of 800 nm at channel index number 0 to a center wavelength of 1100 nm for channel index number 63. As shown by chart 640, filter 610 is associated with 63 channels based on a particular set of channels (e.g., channel numbers 7 and 8) being associated with a common center wavelength based on a dispersion mismatch between hydrogenated silicon and silicon dioxide. Similarly, as shown by chart 640, in contrast to chart 330 in FIG. 3D where in an oxidized case filter 210 is associated with a channel spacing of between approximately 0.5 nm (e.g., for adjacent channels of a channel group) and approximately 35 nm (e.g., for adjacent channels of different channel groups), for filter 610 in the actual case, a channel spacing of between approximately 0 nm and approximately 7 nm, between approximately 4 nm and approximately 7 nm, between approximately 4.5 nm and approximately 5.0 nm, or the like is achieved. In this way, an improvement in a uniformity of channel spacing is achieved by filter 610 relative to filter 210.

As indicated above, FIGS. 6A-6D are provided merely as examples. Other examples are possible and may differ from what was described with regard to FIGS. 6A-6D.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical filter, comprising:
   a first mirror;
   a second mirror; and
   a spacer layer structure disposed between the first mirror and the second mirror,
      the spacer layer structure comprising:
         a first set of layers,
            the first set of layers comprising:
               a first layer deposited using a first material associated with a first refractive index,
               a second layer deposited using the first material,
               a third layer deposited using the first material, and
                  the first layer being associated with a physical thickness that is greater than a layer thickness threshold, and
               the first layer, the second layer, and the third layer being adjacent, and
         a second set of layers,
            each layer, of the second set of layers, being deposited using a second material associated with a second refractive index,
            at least one layer, of the second set of layers, being associated with a physical thickness that is less than the layer thickness threshold, and
            the first set of layers being between the first mirror and the second set of layers.

2. The optical filter of claim 1, where the first material is hydrogenated silicon.

3. The optical filter of claim 1, where the first refractive index is, at approximately 800 nanometers (nm), greater than a 2.0 refractive index.

4. The optical filter of claim 1, where the first material is an oxidizable material.

5. The optical filter of claim 1, where the second material includes an oxide material,
   the oxide material including at least one of:
      a niobium titanium oxide (NbTiOx),
      a silicon dioxide ($SiO_2$),
      an aluminum oxide ($Al_2O_3$),
      a titanium dioxide ($TiO_2$),
      a niobium pentoxide ($Nb_2O_5$),
      a tantalum pentoxide ($Ta_2O_5$),
      a zirconium oxide ($ZrO_2$),
      an yttrium oxide ($Y_2O_3$),
      a hafnium dioxide ($HfO_2$), or
      a combination thereof.

6. The optical filter of claim 1, where the second material includes at least one of:
   a nitride material,
   a fluoride material,
   a sulfide material, or
   a selenide material.

7. The optical filter of claim 1, where the second refractive index is less than the first refractive index.

8. The optical filter of claim 1, where a thickness of a layer, of the second set of layers, is selected based on the second refractive index.

9. The optical filter of claim 1, where the layer thickness threshold is one of:
   approximately 10 nm,
   approximately 5 nm,
   approximately 2.5 nm,
   approximately 2 nm,
   approximately 1.5 nm,
   approximately 1 nm, or
   approximately 0.75 nm.

10. The optical filter of claim 1, where the first mirror and the second mirror each includes one of:
    a metal mirror, or
    a dielectric mirror.

11. The optical filter of claim 1,
    wherein a first physical thickness of the first layer is approximately half of a second physical thickness of the second layer, and wherein the second physical thickness of the second layer is approximately half of a third physical thickness of the third layer.

12. The optical filter of claim 1,
wherein the second set of layers comprise a fourth layer, a fifth layer, and a sixth layer,
wherein the second set of layers is between the second mirror and the first set of layers, and
wherein a first physical thickness of the fourth layer is approximately half of a second physical thickness of the fifth layer, and
wherein the second physical thickness of the fifth layer is approximately half of a third physical thickness of the sixth layer.

13. The optical filter of claim 1,
where the second set of layers forms a plurality of channels each associated with a passing light at a corresponding center wavelength, and
where each center wavelength is separated from an adjacent center wavelength by less than a threshold channel separation.

14. The optical filter of claim 13, where the threshold channel separation is one of:
approximately 30 nanometers (nm),
approximately 15 nm,
approximately 10 nm,
approximately 7 nm,
approximately 6 nm, or
approximately 5 nm.

15. A multispectral filter, comprising:
a first mirror deposited on a substrate associated with a set of sensor elements and to partially reflect light from a light source;
a second mirror to partially reflect light from the light source; and
a spacer disposed between the first mirror and the second mirror and including a plurality of layers associated with a plurality of channels, associated with a passing light at a corresponding center wavelength, corresponding to the set of sensor elements,
first layers, of the plurality of layers, being deposited using hydrogenated silicon with a first refractive index,
the first layers comprising a first layer, a second layer, and a third layer,
the first layer, the second layer, and the third layer being adjacent,
the first layer being associated with a physical thickness greater than a layer thickness threshold, and
second layers, of the plurality of layers, being deposited using a material with a second refractive index,
at least one layer, of the second layers, being associated with a physical thickness that is less than the layer thickness threshold, and
the first layers being between the first mirror and the second layers.

16. The multispectral filter of claim 15, where the material comprises at least one of niobium titanium oxide or silicon dioxide.

17. The multispectral filter of claim 15, where the plurality of layers are deposited using a lift-off process.

18. The multispectral filter of claim 15, where the plurality of layers are associated with passing a portion of light from the light source,
the portion of light being associated with a spectral range of between approximately 800 nanometers (nm) and approximately 1100 nm.

19. The multispectral filter of claim 15, where a quantity of the plurality of channels is greater than or equal to a channel quantity threshold,
the channel quantity threshold being one of:
8 channels,
16 channels,
32 channels,
64 channels, or
128 channels.

20. An optical filter, comprising:
a substrate; and
a set of optical filter layers disposed onto the substrate,
the set of optical filter layers including a first subset of optical filter layers associated with a first refractive index,
the set of optical filter layers including a second subset of optical filter layers associated with a second refractive index that is less than the first refractive index,
the first subset of optical layers including a first layer, a second layer, and a third layer that are deposited using a particular material,
the first layer being associated with a physical thickness that is greater than a layer thickness threshold,
at least one layer, of the second subset of optical filter layers, being associated with a physical thickness that is less than the layer thickness threshold,
the first layer, the second layer, and the third layer being adjacent,
the first subset of optical layers being between a mirror and the second subset of optical filter layers, and
the set of optical filter layers forming a plurality of channels,
each channel being associated with passing light at a corresponding center wavelength, and
each center wavelength being separated from an adjacent center wavelength by less than a threshold channel separation.

* * * * *